(12) United States Patent
Lee et al.

(10) Patent No.: US 12,485,274 B2
(45) Date of Patent: *Dec. 2, 2025

(54) APPARATUS AND METHOD WITH ELECTRICAL STIMULUS

(71) Applicant: Samsung Electronics Co., Ltd., Suwon-si (KR)

(72) Inventors: Don-Wook Lee, Seoul (KR); Sang Joon Kim, Hwaseong-si (KR); Kitae Park, Seoul (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1046 days.

This patent is subject to a terminal disclaimer.

(21) Appl. No.: 17/513,186

(22) Filed: Oct. 28, 2021

(65) Prior Publication Data

US 2022/0280775 A1   Sep. 8, 2022

(30) Foreign Application Priority Data

Mar. 8, 2021 (KR) .................. 10-2021-0030191
Jun. 22, 2021 (KR) .................. 10-2021-0080827

(51) Int. Cl.
| | | |
|---|---|---|
| A61N 1/00 | (2006.01) | |
| A61B 5/05 | (2021.01) | |
| A61B 5/145 | (2006.01) | |
| A61K 9/00 | (2006.01) | |
| A61K 38/28 | (2006.01) | |
| A61M 5/172 | (2006.01) | |
| A61N 1/04 | (2006.01) | |
| A61N 1/08 | (2006.01) | |
| A61N 1/36 | (2006.01) | |
| A61B 5/00 | (2006.01) | |
| A61K 35/12 | (2015.01) | |
| C12M 1/00 | (2006.01) | |
| C12M 1/34 | (2006.01) | |
| C12M 1/42 | (2006.01) | |

(52) U.S. Cl.
CPC .......... *A61N 1/0448* (2013.01); *A61K 9/0009* (2013.01); *A61K 38/28* (2013.01); *A61M 5/1723* (2013.01); *A61N 1/08* (2013.01); *A61N 1/36017* (2013.01); *A61N 1/36031* (2017.08); *A61B 5/0004* (2013.01); *A61B 5/14532* (2013.01); *A61B 5/425* (2013.01); *A61K 35/12* (2013.01); *A61M 2005/1726* (2013.01); *A61M 2205/054* (2013.01); *A61M 2205/3306* (2013.01); *A61M 2205/50* (2013.01); *A61M 2230/201* (2013.01); *C12M 31/02* (2013.01); *C12M 35/02* (2013.01); *C12M 41/38* (2013.01)

(58) Field of Classification Search
None
See application file for complete search history.

(56) References Cited

U.S. PATENT DOCUMENTS

| | | | |
|---|---|---|---|
| 6,558,345 B1 | 5/2003 | Houben et al. | |
| 7,955,613 B2 | 6/2011 | Bruce et al. | |
| 8,066,694 B2 | 11/2011 | Wagener | |
| 10,646,650 B2 | 5/2020 | Cinar et al. | |
| 2007/0191702 A1* | 8/2007 | Yodfat ............... | A61B 5/14546 600/347 |
| 2010/0272697 A1 | 10/2010 | Naji et al. | |
| 2016/0136357 A1 | 5/2016 | Yang | |
| 2018/0221636 A1 | 8/2018 | Stein et al. | |
| 2019/0314572 A1 | 10/2019 | Yang | |
| 2020/0046268 A1 | 2/2020 | Patek et al. | |
| 2020/0179599 A1 | 6/2020 | Madugula et al. | |
| 2021/0220558 A1* | 7/2021 | Hong ................. | A61B 5/14532 |

FOREIGN PATENT DOCUMENTS

| | | |
|---|---|---|
| JP | 4195354 B2 | 12/2008 |
| KR | 10-0266833 B1 | 9/2000 |
| KR | 10-1571782 B1 | 11/2015 |
| KR | 10-1681542 B1 | 12/2016 |

OTHER PUBLICATIONS

Cooper-Jones, Brit et al. "157 Islet Cell Replacement Therapy for Insulin-Dependent Diabetes" *CADTH Issues in Emerging Health Technologies, Canadian Agency for Drugs and Technologies in Health, Ottawa, Canada* Jun. 1, 2017 (9 pages in English).
Hoskins, Mike "Senseonics Halts Sales of Eversense Implantable CGM in Wake of COVID-19 Crisis" https://www.healthline.com/diabetesmine/senseonics-suspends-eversense- implantable . . . Mar. 31, 2020 (8 pages in English).
"ViaCyte and Gore Enter Clinical Phase Agreement Based on Novel Membrane Technology for PEC-Encap Product Candidate" *ViaCyte San Diego, California* Aug. 5, 2020 (3 pages in English).
"The 90-Day Eversense Sensor is Changing Lives" https://www.ascensiadiabetes.com/eversense/eversense-cgm-system/sensor Aug. 18, 2021 (8 pages in English).

* cited by examiner

*Primary Examiner* — Michelle F. Paguio Frising
(74) *Attorney, Agent, or Firm* — NSIP Law

(57) ABSTRACT

An electrical stimulation apparatus includes: a cell cluster container comprising a cell cluster configured to secrete an active material; an indicator container comprising an indicator; a controller configured to apply a stimulation voltage to the cell cluster container based on a sensing signal received from the indicator container; a first entrance connected to the cell cluster container and configured to allow either one or both of the cell cluster to be retracted and a new cell cluster to be injected; and a second entrance connected to the indicator container and configured to allow either one or both of the indicator to be retracted and a new indicator to be injected.

20 Claims, 7 Drawing Sheets

APPARATUS AND METHOD WITH ELECTRICAL STIMULUS

CROSS-REFERENCE TO RELATED APPLICATIONS

This application claims the benefit under 35 USC § 119(a) of Korean Patent Application No. 10-2021-0030191, filed on Mar. 8, 2021, and Korean Patent Application No. 10-2021-0080827, filed on Jun. 22, 2021, in the Korean Intellectual Property Office, the entire disclosures of which are incorporated herein by reference for all purposes.

BACKGROUND

1. Field

The following description relates an apparatus and method with electrical stimulus.

2. Description of Related Art

To supply a therapeutic agent such as insulin to a body, a subcutaneous injection may be periodically performed using an injection. However, such subcutaneous injection may cause inconvenience, and insulin may be injected at an incorrect site. In a scheme of supplying a therapeutic agent into a body using a reservoir and a pump, a reservoir for storing the therapeutic agent may be periodically replaced, which may cause inconvenience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electrical stimulation apparatus includes: a cell cluster container comprising a cell cluster configured to secrete an active material; an indicator container comprising an indicator; a controller configured to apply a stimulation voltage to the cell cluster container based on a sensing signal received from the indicator container; a first entrance connected to the cell cluster container and configured to allow either one or both of the cell cluster to be retracted and a new cell cluster to be injected; and a second entrance connected to the indicator container and configured to allow either one or both of the indicator to be retracted and a new indicator to be injected.

The indicator container may include a light source and an optical sensor, the light source may be configured to irradiate light to the indicator, the optical sensor may be configured to sense light reflected from the indicator and generate the sensing signal based on the sensed light, the cell cluster container may include a first electrode and a second electrode, the cell cluster may be disposed between the first electrode and the second electrode, and the stimulation voltage may be applied to the first electrode and the second electrode to stimulate the cell cluster.

The cell cluster container may have a porous membrane configured to restrict an outflow of the cell cluster from the cell cluster container, and the indicator container may have a porous membrane configured to restrict an outflow of the indicator from the indicator container.

The apparatus may include a memory connected to the controller and configured to store first reference information, wherein the controller may be configured to determine whether the indicator is to be replaced by comparing the sensing signal and the first reference information.

The apparatus may include a memory connected to the controller and configured to store second reference information, wherein the controller may be configured to determine whether a beta cell of the cell cluster is to be replaced by comparing the sensing signal and the second reference information.

The apparatus may include a memory connected to the controller and configured to store personal information, wherein the controller may be configured to adjust the stimulation voltage based on the personal information.

The apparatus may include: a memory connected to the controller; and an antenna connected to the controller, wherein the controller may be configured to store the sensing signal and the stimulation voltage in the memory and to transmit data stored in the memory externally via the antenna.

The apparatus may include: a reception coil corresponding to an external transmission coil; and a battery connected to the reception coil, wherein the reception coil may be configured to transfer power received from the transmission coil to the battery.

In another general aspect, a processor-implemented electrical stimulation method includes: controlling light to be irradiated to an indicator from a light source of an indicator container comprising the indicator; generating a sensing signal based on light reflected from the indicator; determining a stimulation voltage based on the sensing signal; and stimulating a cell cluster by applying the stimulation voltage to a first electrode and a second electrode of a cell cluster container, wherein the cell cluster is either one or both of retracted and replaced with a new cell cluster through a first entrance connected to the cell cluster container, and wherein the indicator is either one or both of retracted and replaced with a new indicator through a second entrance connected to the indicator container.

The method may include determining whether the indicator is to be replaced by comparing the sensing signal and first reference information.

The method may include determining whether a beta cell of the cell cluster is to be replaced by comparing the sensing signal and second reference information.

The determining of the stimulation voltage further may include adjusting the stimulation voltage based on personal information.

In another general aspect, one or more embodiments include a non-transitory computer-readable storage medium storing instructions that, when executed by one or more processors, configure the one or more processors to perform an electrical stimulation method including: controlling light to be irradiated to an indicator from a light source of an indicator container comprising the indicator; generating a sensing signal based on light reflected from the indicator;
  determining a stimulation voltage based on the sensing signal; and stimulating a cell cluster by applying the stimulation voltage to a first electrode and a second electrode of a cell cluster container, wherein the cell cluster is either one or both of retracted and replaced with a new cell cluster through a first entrance connected to the cell cluster container, and wherein the indicator is either one or both of retracted and replaced with a new indicator through a second entrance connected to the indicator container.

The method may include determining whether the indicator is to be replaced by comparing the sensing signal and first reference information.

The method may include determining whether a beta cell is of the cell cluster to be replaced by comparing the sensing signal and second reference information.

The determining of the stimulation voltage further may include adjusting the stimulation voltage based on personal information.

In another general aspect, an electrical stimulation apparatus includes: a cell cluster container configured to contain a cell cluster that secretes an active material; a first entrance connected to the cell cluster to allow the cell cluster to be injected and retracted from the cell cluster container; an indicator container configured to contain an indicator; a second entrance connected to the indicator container to allow the indicator to be injected and retracted from the indicator container; and a controller configured to determine whether either one or both of the cell cluster and the indicator is to be replaced based on a sensing signal received from the indicator container.

The first entrance may include a first end connected to the cell cluster container and a second end configured to be disposed outside a body of a user; and the second entrance may include a first end connected to the indicator container and a second end configured to be disposed outside the body.

The controller may be configured to apply a stimulation voltage to the cell cluster container in response to the sensing signal being greater than or equal to a threshold.

The apparatus may include an antenna, wherein the controller may be configured to transmit data externally via the antenna in response to determining that either one or both of the cell cluster and the indicator is to be replaced.

Other features and aspects will be apparent from the following detailed description, the drawings, and the claims.

Figure 1:
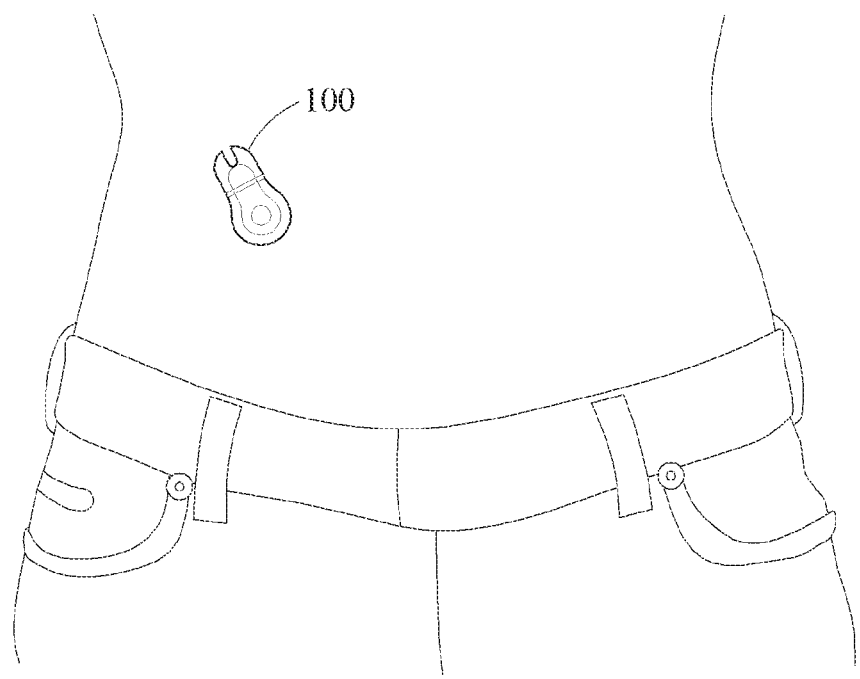
FIG. 1 illustrates an example in which an electrical stimulation apparatus is inserted into a human body.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example in which an electrical stimulation apparatus is inserted into a human body.

In an example, an electrical stimulation apparatus 100 may sense a target material through an indicator configured to sense a concentration of the target material, and may induce secretion of an active material by stimulating a cell cluster configured to secrete the active material based on an increase in an amount of the target material. The electrical stimulation apparatus 100 may replace the cell cluster and the indicator respectively when a life of each of the cell cluster and the indicator expires.

For example, the electrical stimulation apparatus 100 may sense glucose, as the target material, using a glucose indicator and may induce secretion of insulin, as the active material, by stimulating a beta cell according to an increase in glucose. The electrical stimulation apparatus 100 may replace the beta cell and the glucose indicator respectively when a life of each of the beta cell and the glucose indicator expires.

In this example, the target material may include, for example, various materials inside a human body including glucose. The indicator may be configured to sense a concentration of the target material. The active material may be a material for adjusting a concentration of a target material. For example, the active material may include insulin, but is not limited thereto. The cell cluster may be configured to store an active material and to secrete the active material based on an external stimulus. For example, the cell cluster may include a beta cell, but is not limited thereto.

In an example, the electrical stimulation apparatus 100 may be used to place predetermined cells in a body for therapeutic purposes. The electrical stimulation apparatus 100 may be used as an artificial pancreas for measuring blood glucose and controlling secretion of insulin. The electrical stimulation apparatus 100, which may be a cell treatment apparatus for implantation into a body that operates for a relatively long period of time, may be used for treatment of various diseases including diabetes.

In an example, the electrical stimulation apparatus 100 may include a cell cluster container including a cell cluster, an indicator container including an indicator, and a controller configured to control the cell cluster container and the indicator container. The controller may include a processor (e.g., one or more processors). The electrical stimulation apparatus 100 may include a battery. The electrical stimulation apparatus 100 may include a first entrance configured to allow the cell cluster to be retracted or injected. The electrical stimulation apparatus 100 may include a second entrance configured to allow the indicator to be retracted or injected.

The indicator container may store the indicator. The indicator container may sense a concentration of a target material around the indicator container and may transfer a sensing signal to the controller. The indicator container may include a light source and an optical sensor. For example, the light source may include a light emitting diode for emitting light of a predetermined wavelength. In an example, the predetermined wavelength may be a wavelength at which the indicator reacts when the indicator is coupled to the target material. The light source may irradiate light to the indicator. When the indicator is not coupled to the target material, the indicator may not emit light in response to received light. The indicator coupled to the target material may emit light in response to received light.

When the concentration of the target material around the indicator container is low, a relatively small amount of light may be emitted from the indicator that is not coupled to the target material due to a great specific gravity of the indicator, and the optical sensor may not sense a sufficient amount of light and may generate a sensing signal with a low intensity. When the concentration of the target material around the indicator container is high, a relatively large amount of light may be emitted from the indicator coupled to the target material due to a great specific gravity of the indicator, and the optical sensor may sense a sufficient amount of light and may generate a sensing signal with a high intensity.

The indicator container may have a porous surface. The porous surface may allow the target material around the indicator container to pass therethrough. The porous surface may be, for example, a porous membrane that hinders penetration of the indicator and facilitates penetration of the target material. The target material flowing into the indicator container may be coupled to the indicator.

The controller may compare the sensing signal received from the indicator container to a threshold. When the sensing signal is greater than or equal to the threshold, the controller may apply a stimulation voltage to the cell cluster container. The controller may adjust the stimulation voltage based on a magnitude of the sensing signal. When the magnitude of the sensing signal increases, the stimulation voltage applied to the cell cluster container by the controller may increase. When the sensing signal is less than the threshold, the controller may not apply the stimulation voltage to the cell cluster container.

The electrical stimulation apparatus 100 may further include an antenna. The controller may communicate with an external device via the antenna. The controller may store time-series data of a concentration of a target material, a stimulation voltage corresponding to the concentration, and/or a concentration of the target material after secretion of insulin. The controller may transmit the stored data to the external device via the antenna. The controller may receive personal data of a user and/or calibration data via the antenna. The controller may adjust the stimulation voltage and/or a generated sensing signal based on the received personal data and/or the received calibration data. However, this is merely an example, and a variety of data may be exchanged.

The electrical stimulation apparatus 100 may include a power source. The power source may be, for example, a battery. The battery may supply power to an electrode included in the cell cluster container, the controller, and the light source and the optical sensor included in the indicator container.

The battery may be wirelessly charged by a wireless charging scheme. For example, the electrical stimulation apparatus 100 may include a coil for receiving power. The coil may have a shape of wrapping the electrical stimulation apparatus 100. Both ends of the coil may be connected to the battery. The coil of the electrical stimulation apparatus 100 may wirelessly receive power by resonating with a coil of the external device.

A circuit structure used as an antenna may also be used for wireless power charging. For example, when the circuit structure is used as an antenna, both ends of the circuit structure may be opened by a switch. When the circuit structure is used as a reception coil for wireless power charging, both ends of the circuit structure may be shorted by the switch.

The cell cluster container may store a plurality of cell clusters. The cell cluster container may include two or more electrodes. The cell cluster container may include a first electrode and a second electrode. For example, a positive voltage may be applied to the first electrode, and a negative voltage may be applied to the second electrode. The cell cluster may be disposed between the first electrode and the second electrode. When the stimulation voltage is applied to the first electrode and the second electrode, an electrical stimulus may be applied to the cell cluster disposed between the first electrode and the second electrode. By the electrical stimulus, the cell cluster may secrete insulin.

The cell cluster container may have a porous surface. The cell cluster container may release insulin to the outside through the porous surface. A size of a cavity of the porous surface may be less than that of the cell cluster. The porous surface may prevent the cell cluster from flowing out. The porous surface may allow an inflow and outflow of blood. The porous surface may allow an inflow and outflow of various nutrients contained in the blood. A cell function of the cell cluster may be maintained by ingesting nutrients and excreting waste products.

The indicator and the cell cluster may be used for a finite period. A concentration of the target material measured by the indicator after a predetermined period of time may be out of a confidence interval. An amount of insulin secreted by the cell cluster after a predetermined period of time may be out of a confidence interval. The indicator and the cell cluster may need to be replaced after a predetermined period of time.

The first entrance and the second entrance may be used for replacement of the indicator and the cell cluster. The first entrance may be used for replacement of the cell cluster. The second entrance may be used for replacement of the indicator. The first entrance and the second entrance may be connected to a portion of the electrical stimulation apparatus 100 inserted into a body and may protrude to the outside of the body. The first entrance and the second entrance may also be referred to as "portals".

For example, the first entrance may include two pipes. An existing cell cluster may be retracted through one pipe, and a new cell cluster may be injected through the other pipe. For example, the second entrance may include two pipes. An existing indicator may be retracted through one pipe, and a new indicator may be injected through the other pipe.

The electrical stimulation apparatus 100 may have a shape of a rectangular parallelepiped, or an overlapping shape without edges. However, the shape of the electrical stimulation apparatus 100 is not limited thereto, and the electrical stimulation apparatus 100 may have various shapes. Relative positions of the cell cluster container, the controller, and the indicator container may vary, and examples are not limited to one of the drawings provided herein.

The first entrance and the second entrance may be independently connected to the cell cluster container and the indicator container, respectively. A position of each of the first entrance and the second entrance may not be limited unless a structural coupling between the electrical stimulation apparatus 100 and each container is disturbed. The first entrance and the second entrance may be located adjacent to a skin surface to facilitate penetration of a syringe. The first entrance and the second entrance may be connected to the electrical stimulation apparatus 100 with a predetermined spacing. Here, an inner diameter of each of the first entrance and the second entrance may be greater than or equal to a size to minimize an influence on the cell cluster when the cell cluster or a complex of the cell cluster and a gel is injected.

As described above, the electrical stimulation apparatus 100 may sense the concentration of a neighboring target material using the indicator, may analyze the sensed concentration, and may induce the cell cluster to secrete an appropriate amount of insulin by applying the stimulation voltage to the cell cluster. In this example, a time period of use of the indicator and the cell cluster may be finite, and a measurement value obtained by the indicator after a predetermined period of time and an amount of insulin secreted by the cell cluster after a predetermined period of time may be out of the confidence interval. The cell cluster and the indicator of the electrical stimulation apparatus 100 of one or more embodiments may be replaced through an entrance protruding to the outside of a body in which the cell cluster and the indicator are disposed. Thus, the cell cluster and the indicator of the electrical stimulation apparatus 100 of one or more embodiments may be replaced without a surgical operation on the body, and the electrical stimulation apparatus 100 may operate inside the body for a relatively long period of time.

Figure 2:
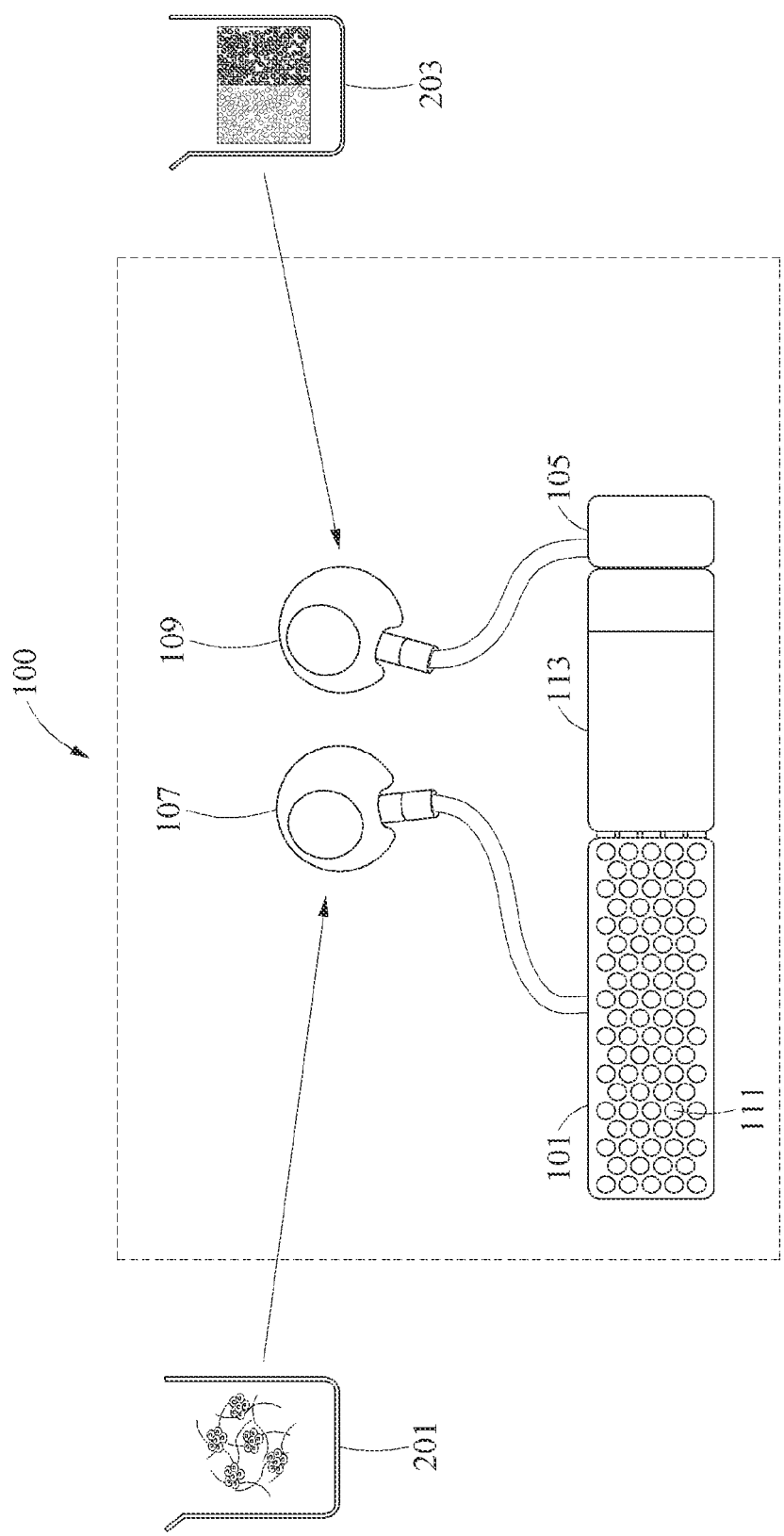
FIG. 2 illustrates an example in which a cell cluster and an indicator of an electrical stimulation apparatus are replaced.

FIG. 2 illustrates an example in which a cell cluster and an indicator of an electrical stimulation apparatus are replaced.

In an example, the electrical stimulation apparatus 100 may include a cell cluster container 101, a main body 113, an indicator container 105, a first entrance 107, and a second entrance 109. The cell cluster container 101 may include one or more cell clusters 111. The indicator container 105 may include one or more indicators 203.

The indicator container 105 may include a light source and an optical sensor. The light source may irradiate light to the indicators, and the optical sensor may sense light reflected from the indicators and generate a sensing signal. When a concentration of a target material around the indicator container 105 is high, a relatively large amount of light may be emitted from an indicator coupled to the target material due to a great specific gravity of the indicator. For example, when the concentration of the target material around the indicator container 105 increases, a specific gravity of the indicator may increase; and when the specific gravity of the indicator increases, an amount of light emitted from the indicator may increase. The optical sensor may sense a sufficient amount of light and may generate a sensing signal with a high intensity.

A controller (e.g., one or more processors) may be included in the main body 113. The controller may apply a stimulation voltage to the cell cluster container 101 based on the sensing signal received from the indicator container 105. When the sensing signal is greater than or equal to a threshold, the controller may apply the stimulation voltage to the cell cluster container 101. The controller may adjust the stimulation voltage based on a magnitude of the sensing signal. When the magnitude of the sensing signal increases, the controller may increase the stimulation voltage applied to the cell cluster container 101.

The cell cluster container 101 may include a first electrode and a second electrode, and a cell cluster 111 may be disposed between the first electrode and the second electrode. The stimulation voltage may be applied to the first electrode and the second electrode so that the cell cluster 111 may be stimulated. When the stimulation voltage is applied to the first electrode and the second electrode, an electrical stimulus may be applied to the cell cluster 111 disposed between the first electrode and the second electrode. By the electrical stimulus, the cell cluster 111 may secrete an active material (e.g., insulin).

The cell cluster container 101 may have a porous membrane configured to restrict an outflow of the cell clusters 111 from the cell cluster container 101. The porous membrane of the cell cluster container 101 may allow an inflow and outflow of blood. The porous membrane may allow an inflow and outflow of various nutrients contained in the blood.

The indicator container 105 may have a porous membrane configured to restrict an outflow of an indicator from the indicator container 105. The porous membrane of the indicator container 105 may be, for example, a porous membrane that hinders penetration of the indicator and facilitates penetration of the target material.

The first entrance 107 may be connected to the cell cluster container 101 and may allow retraction of the cell cluster 111 or injection of a new cell cluster 111 (e.g., cell cluster 201). For example, the first entrance 107 may include two pipes. An existing cell cluster 111 may be retracted through one pipe, and a new cell cluster 111 may be injected through the other pipe.

The second entrance 109 may be connected to the indicator container 105 and may allow retraction of an indicator or injection of a new indicator 203. For example, the second entrance 109 may include two pipes. An existing indicator may be retracted through one pipe, and a new indicator may be injected through the other pipe.

The electrical stimulation apparatus 100 may further include a memory connected to the controller. The memory may store first reference information. Here, the first reference information may be a criterion for determining whether to replace an indicator. For example, the first reference information may be a criterion for an amount of light received from the indicator. The controller may determine whether the indicator is to be replaced, by comparing the sensing signal to the first reference information.

The memory may store second reference information. Here, the second reference information may be a criterion for determining whether to replace the cell cluster 111. The controller may determine whether the cell cluster 111 is to be replaced, by comparing the sensing signal to the second reference information.

The memory may store personal information. The controller may adjust the stimulation voltage based on the personal information. The memory may store calibration information. The controller may adjust the sensing signal or the stimulation voltage based on the calibration information.

The electrical stimulation apparatus 100 may further include an antenna connected to the controller. The controller may store the sensing signal and the stimulation voltage in the memory, and may transmit data stored in the memory externally via the antenna.

The electrical stimulation apparatus 100 may further include a battery. The electrical stimulation apparatus 100 may further include a reception coil corresponding to an external transmission coil. The battery may be connected to the reception coil. The reception coil may transfer power received from the transmission coil to the battery.

A circuit structure used as an antenna may also be used for wireless power charging. For example, when the circuit structure is used as an antenna, both ends of the circuit structure may be opened by a switch. When the circuit structure is used as a reception coil for wireless power charging, both ends of the circuit structure may be shorted by the switch.

Figure 3:
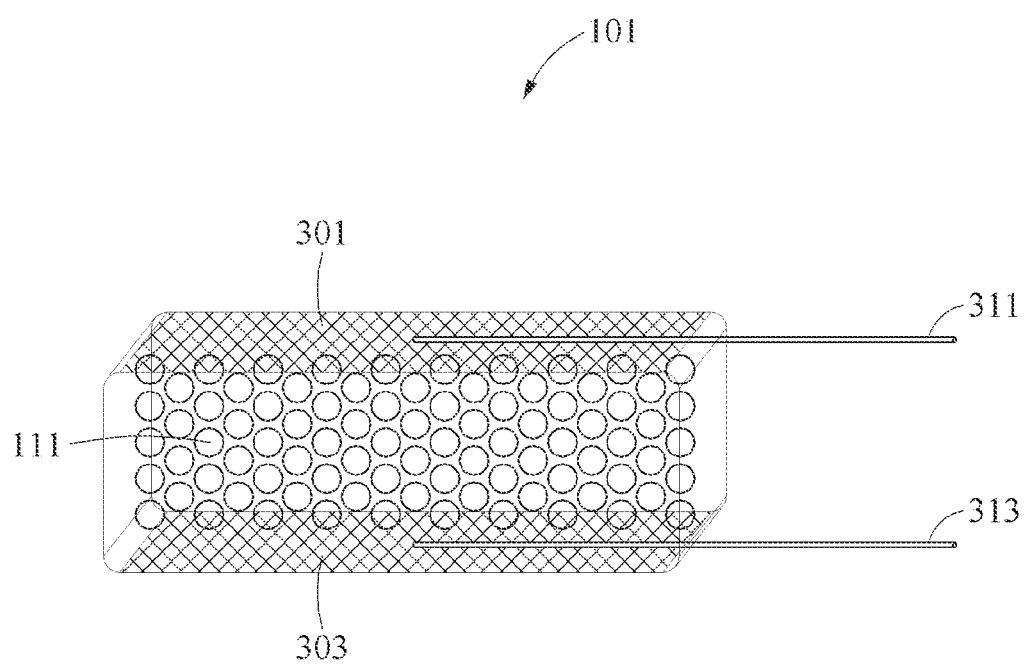
FIG. 3 illustrates an example of a structure of a cell cluster container.

FIG. 3 illustrates an example of a structure of a cell cluster container.

Referring to FIG. 3, a cell cluster container 101 may include a first electrode 301 and a second electrode 303. A positive stimulation voltage may be applied to the first electrode 301 through an electrode line 311. A negative stimulation voltage may be applied to the second electrode 303 through an electrode line 313. A cell cluster 111 may be disposed between the first electrode 301 and the second electrode 303.

A controller may compare a sensing signal received from an indicator container to a threshold. When the sensing signal is less than the threshold, the controller may not apply a stimulation voltage to the cell cluster container 101. When the sensing signal is greater than or equal to the threshold, the controller may apply stimulation voltages to the first electrode 301 and the second electrode 303. The controller may adjust the stimulation voltage based on a magnitude of the sensing signal. When the magnitude of the sensing signal increases, the controller may increase stimulation voltages applied to the first electrode 301 and the second electrode 303. When the stimulation voltages are applied to the first electrode 301 and the second electrode 303, an electrical stimulus may be applied to the cell cluster 111 disposed between the first electrode 301 and the second electrode 303. By the electrical stimulus, the cell cluster 111 may secrete insulin.

Figure 4:
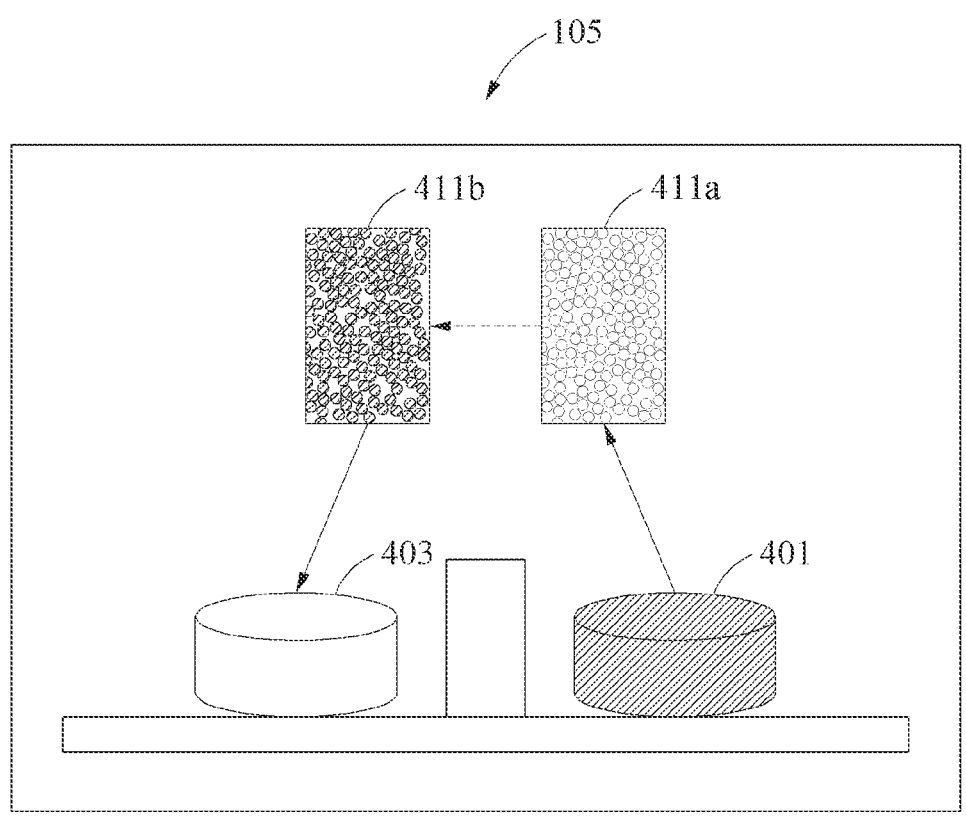
FIG. 4 illustrates an example in which a target material is sensed by an indicator.

FIG. 4 illustrates an example in which a target material is sensed by an indicator.

Referring to FIG. 4, an indicator container 105 may include a light source 401 and an optical sensor 403. For example, the light source 401 may include a light emitting diode for emitting light of a predetermined wavelength. In this example, the predetermined wavelength may be a wavelength at which the indicator reacts when the indicator is coupled to the target material.

The indicator container 105 may have a porous surface. The porous surface may allow a target material around the indicator container 105 to pass therethrough. The porous surface may be, for example, a porous membrane that hinders penetration of the indicator and facilitates penetration of the target material. The target material flowing into the indicator container 105 may be coupled to the indicator.

The light source 401 may irradiate light to the indicator. An indicator 411a that is not coupled to the target material may not emit light in response to received light. An indicator 411b coupled to the target material may emit light in response to received light.

When a concentration of the target material around the indicator container 105 is low, a relatively small amount of light may be emitted from an indicator that is not coupled to the target material due to a great specific gravity of the indicator. Accordingly, when the concentration of the target material around the indicator container 105 is low, the optical sensor 403 may not sense a sufficient amount of light and may generate a sensing signal with a low intensity.

When a concentration of a target material around the indicator container 105 is high, a relatively large amount of light may be emitted from an indicator coupled to the target material due to a great specific gravity of the indicator. The optical sensor 403 may sense a sufficient amount of light and generate a sensing signal with a high intensity.

Figure 5:
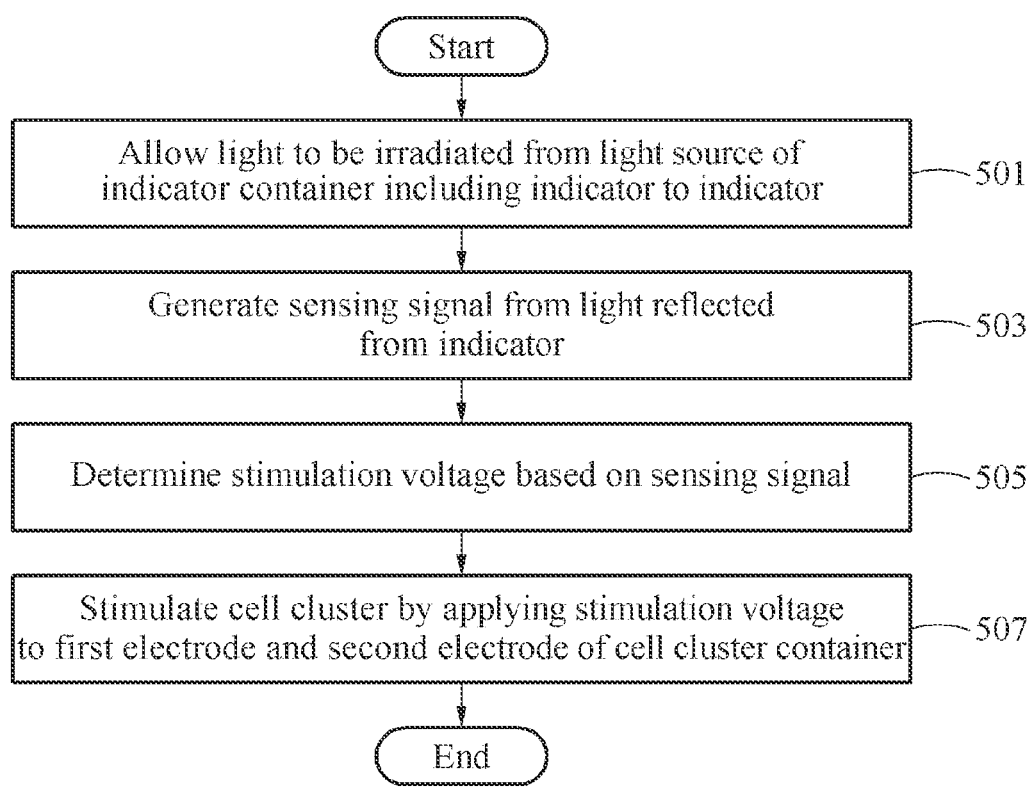
FIG. 5 is a flowchart illustrating an example of an electrical stimulation method.

FIG. 5 is a flowchart illustrating an example of an electrical stimulation method.

Referring to FIG. 5, in operation 501, an electrical stimulation apparatus 100 may control light to be irradiated from a light source of an indicator container including an indicator to the indicator.

In operation 503, the electrical stimulation apparatus 100 may generate a sensing signal from light reflected from the indicator.

In operation 505, the electrical stimulation apparatus 100 may determine a stimulation voltage based on the sensing signal. The electrical stimulation apparatus 100 may adjust the stimulation voltage based on personal information.

In operation 507, the electrical stimulation apparatus 100 may stimulate a cell cluster by applying the stimulation voltage to a first electrode and a second electrode of a cell cluster container.

The electrical stimulation apparatus 100 may determine whether the indicator is to be replaced by comparing the sensing signal to first reference information. The indicator may be retracted or replaced with a new indicator through a second entrance connected to the indicator container.

The electrical stimulation apparatus 100 may determine whether a beta cell is to be replaced by comparing the sensing signal to second reference information. The cell cluster may be retracted or replaced with a new cell cluster through a first entrance connected to the cell cluster container.

Figure 6:
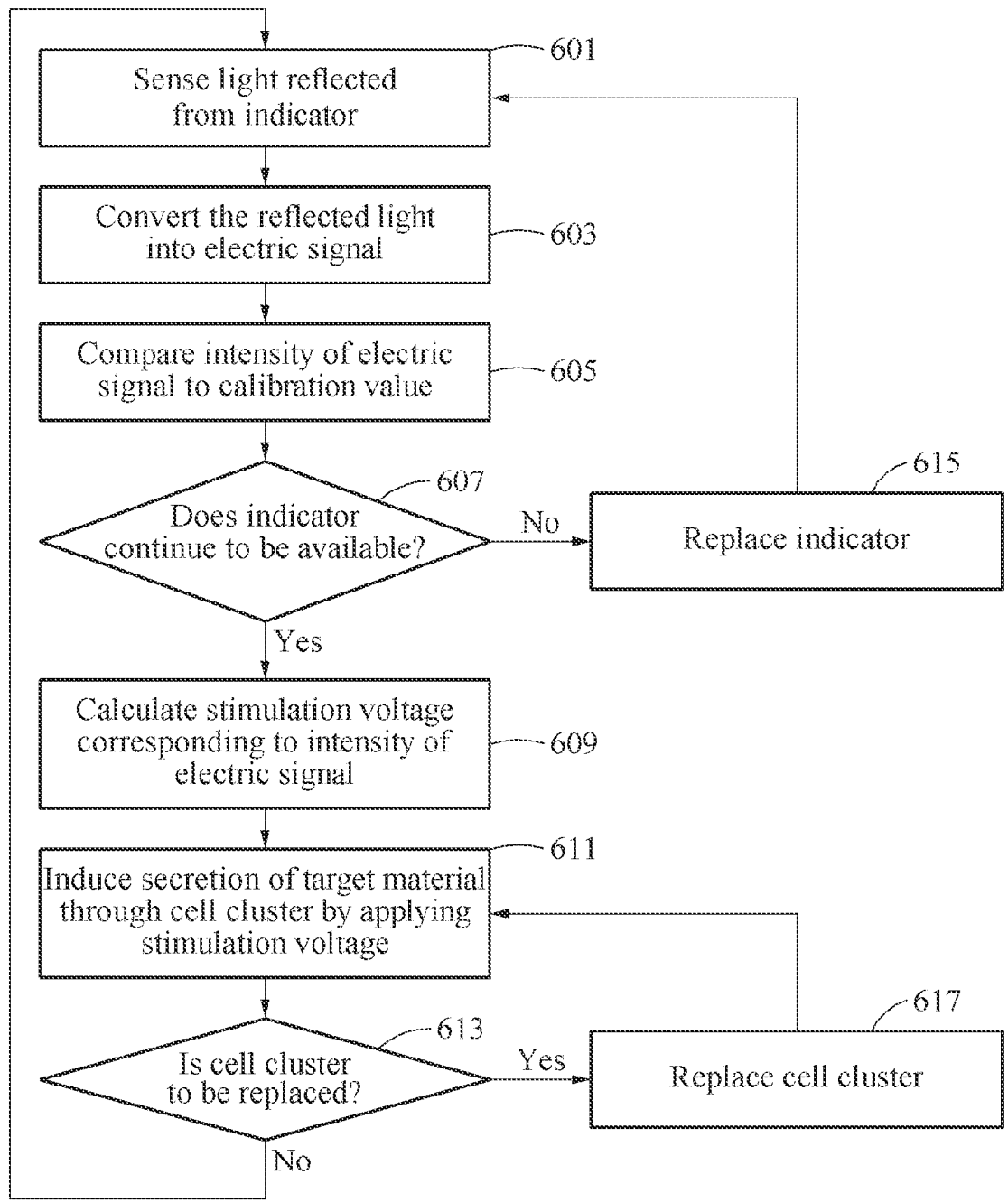
FIG. 6 illustrates an example of an electrical stimulation method.

FIG. 6 illustrates an example of an electrical stimulation method.

Referring to FIG. 6, in operation 601, an electrical stimulation apparatus 100 may sense light reflected from an indicator.

In operation 603, the electrical stimulation apparatus 100 may convert the reflected light into an electric signal.

In operation 605, the electrical stimulation apparatus 100 may compare an intensity of the electric signal and a calibration value.

In operation 607, the electrical stimulation apparatus 100 may determine whether the indicator continues to be available.

In an example, when it is determined that the indicator continues to be available in operation 607, the electrical stimulation apparatus 100 may calculate the intensity of the electric signal and a stimulation voltage corresponding to the intensity of the electric signal in operation 609.

In another example, when it is determined that the indicator continues to be unavailable in operation 607, the electrical stimulation apparatus 100 may replace the indicator in operation 615 or may send a signal indicating that the indicator is to be replaced to an external device via an antenna.

In operation 611, the electrical stimulation apparatus 100 may induce secretion of insulin through a cell cluster by applying the stimulation voltage.

In operation 613, the electrical stimulation apparatus 100 may determine whether the cell cluster is to be replaced.

In an example, when it is determined that the cell cluster is to be replaced in operation 613, the electrical stimulation apparatus 100 may replace the cell cluster in operation 617 or may send a signal indicating that the cell cluster is to be replaced to the external device via the antenna.

In another example, when it is determined that the cell cluster is not to be replaced, the electrical stimulation apparatus 100 may repeatedly perform the above-described operations from operation 601.

Figure 7:
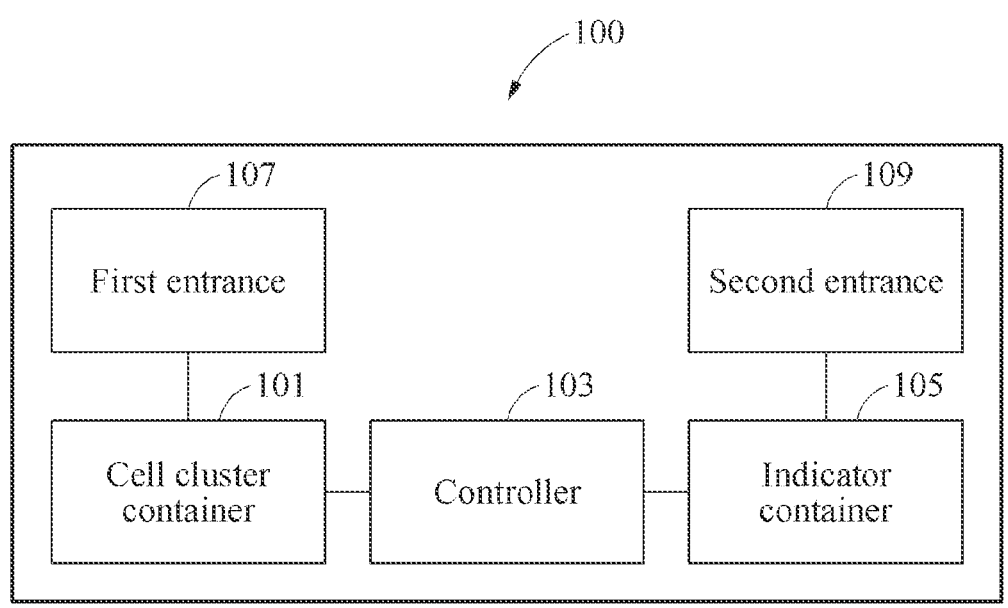
FIG. 7 illustrates an example of an electrical stimulation apparatus.

FIG. 7 illustrates an example of an electrical stimulation apparatus.

Referring to FIG. 7, an electrical stimulation apparatus 100 may include a cell cluster container 101, a controller 103 (e.g., one or more processors), an indicator container 105, a first entrance 107, and a second entrance 109.

The cell cluster container 101 may contain a cell cluster that secretes an active material. The cell cluster container 101 may include a first electrode and a second electrode. For example, the cell cluster may be disposed between the first electrode and the second electrode. In this example, when a stimulation voltage is applied to the first electrode and the second electrode, the cell cluster may be stimulated.

The indicator container 105 may contain an indicator. The indicator container 105 may include a light source and an optical sensor. The light source may irradiate light to the indicator, and the optical sensor may sense light reflected from the indicator and generate a sensing signal.

In an example, the cell cluster container 101 may have a porous membrane configured to restrict an outflow of the cell cluster from the cell cluster container 101. The indicator container 105 may have a porous membrane configured to restrict an outflow of the indicator from the indicator container 105.

The controller 103 may apply a stimulation voltage to the cell cluster container 101 based on the sensing signal received from the indicator container 105. The controller 103 may be connected to a memory. In an example, the memory may store first reference information, and the controller 103 may determine whether the indicator is to be replaced by comparing the sensing signal and the first reference information. In another example, the memory may store second reference information, and the controller 103 may determine whether a beta cell is to be replaced by comparing the sensing signal and the second reference information. In another example, the memory may store personal information, and the controller 103 may adjust the stimulation voltage based on the personal information.

The controller 103 may be connected to an antenna. The controller 103 may store the sensing signal and the stimulation voltage in the memory, and transmit data stored in the memory externally via the antenna.

The first entrance 107 may be connected to the cell cluster container 101 and may be used to retract the cell cluster or inject a new cell cluster.

The second entrance 109 may be connected to the indicator container 105 and may be used to retract the indicator or inject a new indicator.

The electrical stimulation apparatuses, cell cluster containers, main bodies, indicator containers, first entrances, second entrances, first electrodes, second electrodes, electrode lines, light sources, optical sensors, indicators, controllers, electrical stimulation apparatus 100, cell cluster container 101, main body 113, indicator container 105, first entrance 107, second entrance 109, first electrode 301, second electrode 303, electrode line 311, electrode line 313, light source 401, optical sensor 403, indicator 411*a*, indicator 411*b*, a controller 103, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An electrical stimulation apparatus, the apparatus comprising:
   a cell cluster container comprising a cell cluster configured to secrete an active material;
   an indicator container comprising an indicator;
   a controller configured to apply a stimulation voltage to the cell cluster container based on a sensing signal received from the indicator container;
   a first entrance connected to the cell cluster container and configured to allow either one or both of the cell cluster to be retracted and a new cell cluster to be injected; and
   a second entrance connected to the indicator container and configured to allow either one or both of the indicator to be retracted and a new indicator to be injected.

2. The apparatus of claim 1, wherein
the indicator container comprises a light source and an optical sensor,
the light source is configured to irradiate light to the indicator,
the optical sensor is configured to sense light reflected from the indicator and generate the sensing signal based on the sensed light,
the cell cluster container comprises a first electrode and a second electrode,
the cell cluster is disposed between the first electrode and the second electrode, and
the stimulation voltage is applied to the first electrode and the second electrode to stimulate the cell cluster.

3. The apparatus of claim 1, wherein
the cell cluster container has a porous membrane configured to restrict an outflow of the cell cluster from the cell cluster container, and
the indicator container has a porous membrane configured to restrict an outflow of the indicator from the indicator container.

4. The apparatus of claim 1, further comprising:
a memory connected to the controller and configured to store first reference information,
wherein the controller is configured to determine whether the indicator is to be replaced by comparing the sensing signal and the first reference information.

5. The apparatus of claim 1, further comprising:
a memory connected to the controller and configured to store second reference information,
wherein the controller is configured to determine whether a beta cell of the cell cluster is to be replaced by comparing the sensing signal and the second reference information.

6. The apparatus of claim 1, further comprising:
a memory connected to the controller and configured to store personal information,
wherein the controller is configured to adjust the stimulation voltage based on the personal information.

7. The apparatus of claim 1, further comprising:
a memory connected to the controller; and
an antenna connected to the controller,
wherein the controller is configured to store the sensing signal and the stimulation voltage in the memory and to transmit data stored in the memory externally via the antenna.

8. The apparatus of claim 1, further comprising:
a reception coil corresponding to an external transmission coil; and
a battery connected to the reception coil,
wherein the reception coil is configured to transfer power received from the transmission coil to the battery.

9. A processor-implemented electrical stimulation method using the electrical stimulation apparatus of claim 1, the method comprising:
controlling light to be irradiated to an indicator from a light source of an indicator container comprising the indicator;
generating a sensing signal based on light reflected from the indicator;
determining a stimulation voltage based on the sensing signal; and
stimulating a cell cluster by applying the stimulation voltage to a first electrode and a second electrode of a cell cluster container,
wherein the cell cluster is either one or both of retracted and replaced with a new cell cluster through a first entrance connected to the cell cluster container, and
wherein the indicator is either one or both of retracted and replaced with a new indicator through a second entrance connected to the indicator container.

10. The method of claim 9, further comprising:
determining whether the indicator is to be replaced by comparing the sensing signal and first reference information.

11. The method of claim 9, further comprising:
determining whether a beta cell of the cell cluster is to be replaced by comparing the sensing signal and second reference information.

12. The method of claim 9, wherein the determining of the stimulation voltage further comprises adjusting the stimulation voltage based on personal information.

13. A non-transitory computer-readable storage medium storing instructions that, when executed by one or more processors, configure the one or more processors to perform the electrical stimulation method of claim 9, the method comprising:
controlling light to be irradiated to an indicator from a light source of an indicator container comprising the indicator;
generating a sensing signal based on light reflected from the indicator;
determining a stimulation voltage based on the sensing signal; and
stimulating a cell cluster by applying the stimulation voltage to a first electrode and a second electrode of a cell cluster container,
wherein the cell cluster is either one or both of retracted and replaced with a new cell cluster through a first entrance connected to the cell cluster container, and
wherein the indicator is either one or both of retracted and replaced with a new indicator through a second entrance connected to the indicator container.

14. The non-transitory computer-readable storage medium of claim 13, wherein the method further comprises:
determining whether the indicator is to be replaced by comparing the sensing signal and first reference information.

15. The non-transitory computer-readable storage medium of claim 13, wherein the method further comprises:
determining whether a beta cell is of the cell cluster to be replaced by comparing the sensing signal and second reference information.

16. The non-transitory computer-readable storage medium of claim 13, wherein the determining of the stimulation voltage further comprises adjusting the stimulation voltage based on personal information.

17. An electrical stimulation apparatus, the apparatus comprising:
a cell cluster container configured to contain a cell cluster that secretes an active material;
a first entrance connected to the cell cluster, of the cell cluster container, to allow the cell cluster to be injected and retracted from the cell cluster container;
an indicator container configured to contain an indicator;
a second entrance connected to the indicator container to allow the indicator to be injected and retracted from the indicator container; and
a controller configured to determine whether either one or both of the cell cluster and the indicator are to be replaced based on a sensing signal received from the indicator container.

18. The apparatus of claim 17, wherein
the first entrance comprises a first end connected to the cell cluster container and a second end configured to be disposed outside a body of a user; and
the second entrance comprises a first end connected to the indicator container and a second end configured to be disposed outside the body.

19. The apparatus of claim 17, wherein the controller is configured to apply a stimulation voltage to the cell cluster container in response to the sensing signal being greater than or equal to a threshold.

20. The apparatus of claim 17, further comprising an antenna,
wherein the controller is configured to transmit data externally via the antenna in response to determining that either one or both of the cell cluster and the indicator are to be replaced.

* * * * *